United States Patent

[11] 3,546,444

| [72] | Inventors | Paul Roussopoulos<br>38 Avenue George V 8eme;<br>Gregoire Kalopissis, 64 rue Vauvenargues<br>18 eme, Paris, France |
|---|---|---|
| [21] | Appl. No. | 766,428 |
| [22] | Filed | Oct. 10, 1968 |
| [45] | Patented | Dec. 8, 1970 |
| [32] | Priority | Oct. 13, 1967 |
| [33] | | France |
| [31] | | No. 124449 |

[54] DEVICE FOR REGISTERING MEAN OR AVERAGE VALUES INCLUDING A LOGARITHMIC RESISTANCE
4 Claims, 3 Drawing Figs.

[52] U.S. Cl. .................................................. 235/193, 324/70
[51] Int. Cl. .................................................. G01p 3/10; G06g 7/00
[50] Field of Search .......................................... 235/193, 184, 197; 324/70F, 71; 328/145, 142; 338/(Inquired); 73/488(Inquired)

[56] References Cited
UNITED STATES PATENTS

| 1,406,235 | 2/1922 | Smith | 235/193 |
| 2,457,287 | 12/1948 | Townes | 235/193X |
| 2,795,758 | 6/1957 | Cahn, Jr. | 324/70(F) |
| 3,210,530 | 10/1965 | Bravenec | 235/193X |

Primary Examiner— Eugene G. Botz
Assistant Examiner—Joseph F. Ruggiero
Attorney—Holcombe, Wetherill & Brisebois ABSTRACT: A device for measuring an average value comprising a logarithmic resistance connected to a source of electric power and consisting of a plurality of individual resistors connected in series. A measuring instrument is connected between two sliding contacts, one of which moves along junctions of the resistors with the length of the path of travel proportional to the magnitude of the divisor, while the other one moves along the junctions with the path of travel proportional to the magnitude of the dividend.

DEVICE FOR REGISTERING MEAN OR AVERAGE VALUES INCLUDING A LOGARITHMIC RESISTANCE

This invention relates to a device for registering mean or average values.

This device can, for example, be used advantageously to determine the mean or average speed at which a journey has been covered by a vehicle.

According to the present invention there is provided a device for measuring and registering a mean or average value, comprising a logarithmic resistance connectable to a voltage source, a first slider adapted to travel along the logarithmic resistance in proportion to the size of the divisor serving to determine the average, a second slider adapted to travel along the logarithmic resistance in proportion to the size of the divisor serving to determine the average, and an ammeter connected to the sliders and from which the mean or average value can be read off.

In a particular embodiment of the invention, the device is used to register or determine the mean or average hourly speed of a vehicle on a journey of any length. For this purpose, the displacement of the first slider, is proportional to the distance covered by the vehicle, while the displacement of the second slider is proportional to the time taken for the journey.

In the case where the device according to the present invention is mounted on a motor vehicle, the first slider can be advantageously driven or entrained by a mechanism connected to the milometer of the vehicle, while the second slider can advantageously be driven or entrained by a clock mechanism, for example the clock in the vehicle.

In accordance with a preferred embodiment of the invention, the two sliders are each connected to their driving or entrainment mechanism by a clutch and are each subject to the action of a spring which returns them to their initial position when the user operates the clutches.

The expression "logarithmic resistance" used herein is to be construed as meaning resistance, the value of which, taken between one of its extremities and a point on the resistance length, is directly proportional to the logarithm of the distance between the extremity and said point.

A resistance of this type may be a continuous resistance produced, for example, by a layer of variable thickness material which is a poor conductor of electricity. This logarithmic resistance may also be a discontinuous resistance comprising closely-spaced contact studs, preferably equidistant, between which there are placed fixed resistances of predetermined value.

In accordance with one aspect of the invention it is preferred to increase the accuracy of measurement by using a logarithmic resistance of substantial value, in such a way as to make the contact resistance of the sliders negligible. By this means, the differential effect of the resistances of these sliding contacts, which are virtually inevitable when the contacts have to be produced economically, can be obviated or mitigated.

In a preferred embodiment of the invention, the logarithmic resistance is of cylindrical shape and is constituted by commercial resistance such, for example as those which are at present used in radio and electrical engineering. The conductor wires of these resistances serve as contact studs for the logarithmic resistance, since they are housed in notches distributed regularly on the periphery of a cylindrical drum. The electrical circuit is produced by simply soldering the resistance end to end.

In one embodiment the sliders are driven or entrained concentrically to the axis of the logarithmic resistance.

An embodiment of the present invention will now be described, by way of example, with reference to the accompanying drawings, in which.

Figure 1:
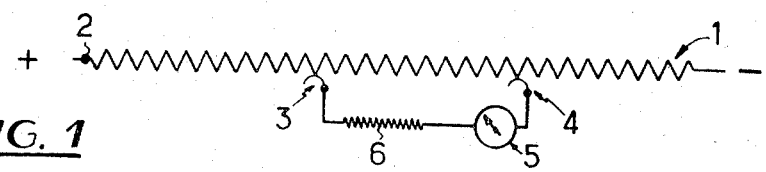
FIG. 1 is a diagrammatic circuit diagram showing the principle of the present invention.

In FIG. 1 there is shown diagrammatically the logarithmic resistance 1 which is such that when there is a displacement of a slider along the resistance starting from the terminal 2, the value of the resistance between a point reached by the slider and the terminal 2 is directly proportional to the logarithm of the distance between said point and the terminal 2.

A slider 3 travels from the terminal 2 proportionally to the time during which it is desired to establish the mean or average speed, while a slider 4 also travels along from the terminal 2 proportionally to the distance covered.

The result is that the resistance between the terminal 2 and the point reached by slider 3 is proportional to the time, while the resistance between the terminal 2 and the point reached by slider 4 is proportional to the distance covered.

Since the mean or average speed is equal to the relationship of the distance covered to the time taken to cover this distance, the logarithm of the relationship distance time is equal to the difference of the logarithms of distance and of time. However, the difference of these logarithms corresponds exactly to the value of the resistance between the sliders 3 and 4, in such a way that an ammeter 5, connected between the sliders 3 and 4 and in series with a resistance 6, makes it possible, by means of suitable graduations, to read off the mean or average speed directly from the ammeter 5.

Figure 2:
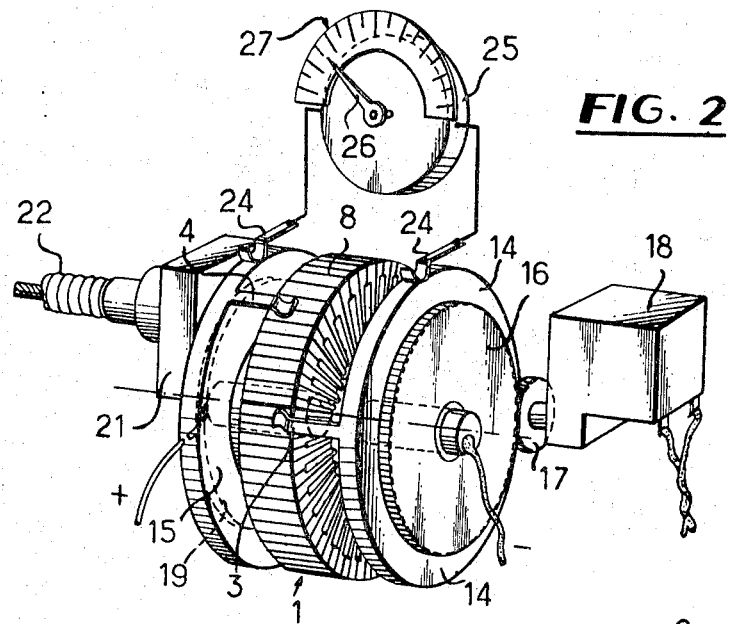
FIG. 2 is a diagrammatic perspective view of the calculating and recording device.
Figure 3:
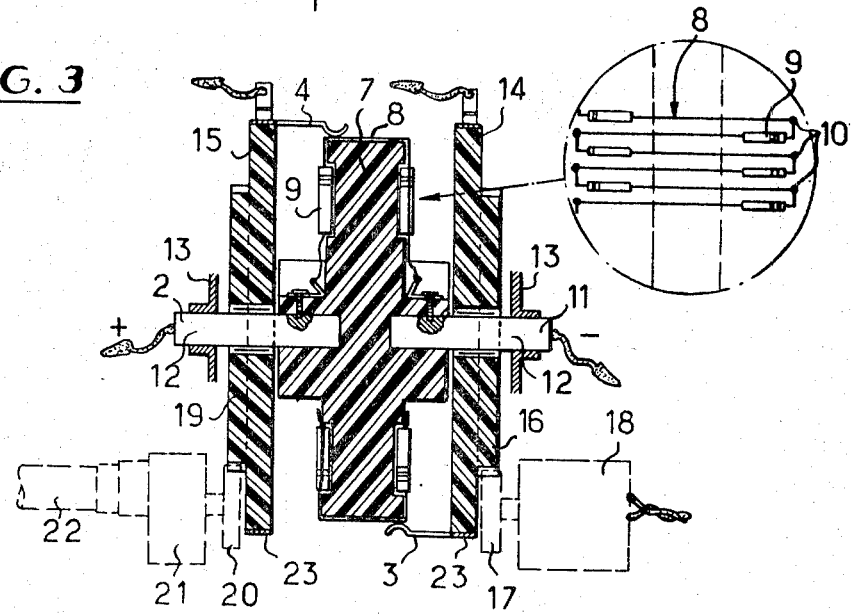
FIG. 3 is an axial sectional view of the device shown in FIG. 2.

In FIGS. 2 and 3 there is shown a particular embodiment of the invention, in which the logarithmic resistance 1 is located on a drum 7 made of an insulating material, and provided on its periphery with a series of equally-spaced notches, in which are located wires 8 of electrical resistances 9 such as those which are at present used in electronics. These resistances 9 are soldered to each other in series at the points 10. The resistances 9 are selected so as to obtain logarithmic spacings between the successive wires 8, which constitute the contact studs of the resistance 1.

By way of example, a logarithmic resistance can be produced according to the invention by using only conventional radio resistances, which are 100 in number and which have values ranging from 0.43 to 30 kilo-ohms.

As can be seen from the drawing, the terminals 2 and 11 of the logarithmic resistance are connected respectively to a positive voltage and to a negative voltage, this electrical connection being effected through shafts 12 which are integral with a frame 13 and on which rotate disks 14 and 15 which support the sliders 3 and 4 respectively.

The disc 14 is integral with a toothed wheel 16 with which is meshed a pinion 17 driven or entrained in proportion to the time registered by an electric clock 18. The disc 15 also comprises a toothed wheel 19 which is driven or entrained by a pinion 20 connected to a reducing gear 21 rotated by a cable 22 of the mileage counter of the vehicle.

The peripheries of the disks 14 and 15 are constituted by conductor bands 23 to which are connected the sliders 3 and 4 respectively and on which rest the brushes 24 connected to the terminals of a microammeter 25, the needle 26 of which indicates directly on a dial 27 the mean or average hourly speed attained by the vehicle.

The operation of the device is extremely simple, since at the beginning of the operation it is sufficient to return the sliders 3 and 4 to their initial position, in order to have the mean or average hourly speed calculated and registered from this instance permanently on the dial 27.

The precision of the device according to the invention is considerable, except for the first few moments of its operation. At the end of journeys of, for example, one to two hours, the accuracy of the average is only limited by the accuracy of the measurement of the distance covered. Indeed it is known to be relatively difficult to measure the distance covered by a moving vehicle, this being due to several factors amongst which are the sliding of wheels in relation to the ground, and the variation in the radius of the wheels, which is particularly important in the case of a vehicle fitted with tyres.

Where it is desirable to increase the accuracy of the average speed measured, it is possible to provide on the device an arrangement for counting the miles covered starting from the commencement of the operation of the device, and a manual control which makes it possible to restore the exact mileage after passing a point which is known to be a certain distance from the point of departure.

It is understood that the embodiment described above is in no way limitative and that it can have any desired modifications without departing from the scope of the accompanying claims.

Particularly, it will be clear that the invention is not limited to devices for determining the average speed of a vehicle, but that it may be used whenever it is necessary to determine and register permanently the relationship of two variable magnitudes.

In the same way, it will be manifest that the logarithmic resistance may be formed other than in the manner described. This resistance may be made in a linear shape or in the shape of a flat disks.

The device may incorporate a clutch between, for example, each of the disks 14 and 15 or associated parts and consequently the sliders 3 and 4 and their respective drives, i.e. the clock 18 and mileometer cable 22, and return springs may be provided to rotate them to their initial starting positions.

We claim:

1. Device for measuring and indicating an terminals obtained by dividing a dividend by a divisor, said device comprising a first resistance including a plurality of individual resistors the values of which vary in a logarithmic progression, said individual resistors being connected in series, with each individual resistor having a terminal in common with an adjacent resistor, a first sliding contact mounted to slide along said terminals, the path of travel of said sliding contact from a predetermined point of origin being proportional to the magnitude of the divisor, a second sliding contact slidable along said terminals, the length of the path of travel of said second contact arm from said predetermined point of origin being proportional to the magnitude of the dividend, a source of electric power connected to the end terminals of said first resistance to supply a current to said first resistance, and an ammeter having a terminal connected to a second resistance, the other terminals of the ammeter and of the second resistance being connected one to the first sliding contact and the other to the second sliding contact, and said ammeter comprising a scale directly indicating the average value obtained.

2. Device as claimed in claim 1 for measuring an average speed comprising clockwork connected to drive the first sliding contact and means responsive to a distance travelled which is connected to drive said second sliding contact.

3. Device for measuring and indicating an average value of the speed of a vehicle, which device comprises a first resistance including a plurality of individual resistors the values of which vary in a logarithmic progression, said individual resistors being positioned in series, each individual resistor having a terminal in common with an adjacent resistor, said individual resistors being mounted on a circular support with their terminals positioned in a circular path on said support, a first sliding contact mounted to be driven in rotation about the axis of said support, clockwork connected to drive said first sliding contact from a predetermined point of origin along a path adjacent said terminals, the length of which path is proportional to the time elapsed since starting of the clockwork, a second sliding contact mounted to rotate about said axis so as to slide over the terminals from a predetermined point of origin for a distance proportional to the distance traveled by the vehicle since the device was started. a source of electric power connected across the endmost terminals of the first resistance to constantly supply a current through the first resistance, and an ammeter having a terminal connected with a second resistance, the other terminals of the ammeter and of the second resistance being connected one to the first traveling contact and the other to the second traveling contact, and the scale of the ammeter being graduated to indicate said average value of speed of the vehicle.

4. Device as claimed in claim 3, in which said first and second sliding contacts are each mounted on a disk, each of said two disks being mounted to rotate about the axis of the said circular support, the end faces of said disks being made of a conductive material and each cooperating with a brush, the brush cooperating with one of the disks being connected to one of the terminals of the second resistance and the brush cooperating with the other disc being connected to a terminal of the ammeter.